United States Patent Office

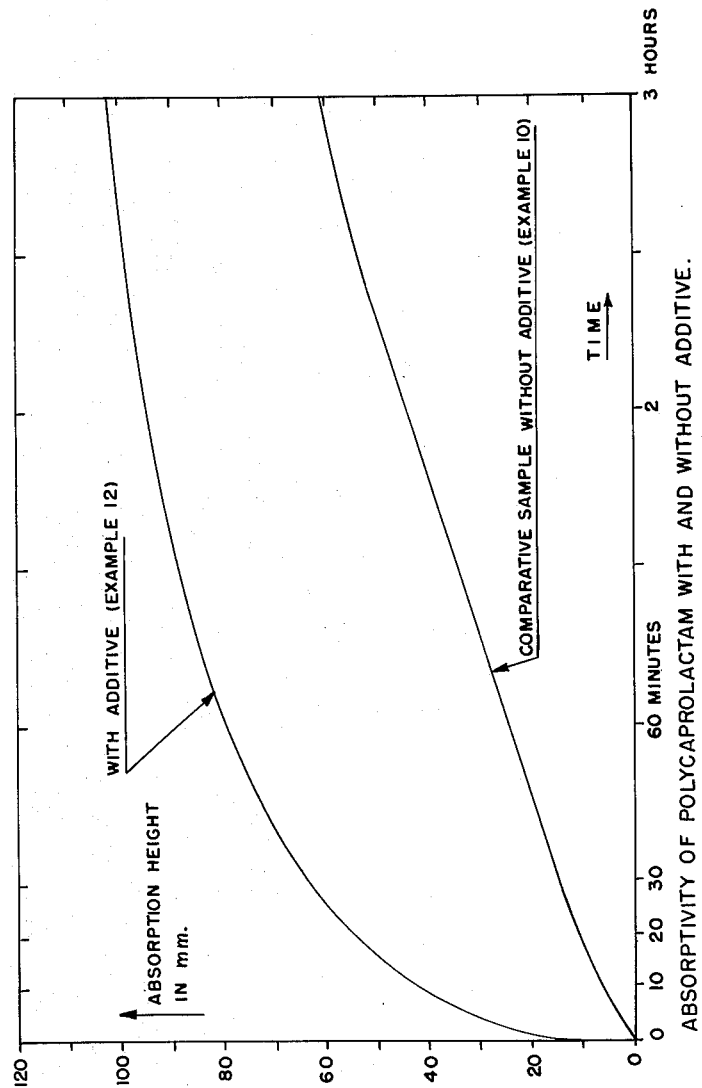

3,238,180
Patented Mar. 1, 1966

3,238,180
MODIFIED POLYAMIDES AND POLYESTERS
Fritz Wiloth, Klingenberg, Germany, assignor to Vereinigte Glanzstoff-Fabriken A.G., Wuppertal-Elberfeld, Germany
Filed Feb. 12, 1962, Ser. No. 172,823
Claims priority, application Germany, Feb. 14, 1961, V 20,150
10 Claims. (Cl. 260—47)

This invention relates to modified polyamides and polyesters having enhanced properties, and more particularly, the invention is concerned with an improvement in those polyamides and polyesters which are generally classified as synthetic fiber-forming linear polymers. These polymers may also be classified as linear condensation polymers, sometimes referred to as "polycondensates."

The most common fiber-forming polyamides are those obtained from caprolactam or hexamethylene adipamide, while the most widely accepted fiber-forming polyester is polyethylene terephthalate. These polycondensates and closely related polyamides and polyesters have properties which make them especially suitable for the production of such textile products as filaments, staple fibers, thread, fabrics, knitted textiles and the like as well as for the production of a number of other useful articles. However, there are certain fiber properties or qualities which are lacking in fully synthetic polymers by comparison with natural or regenerated fibrous polymers. For example, with special concern for the use of polyamides and polyesters for application in the textile industry, it would be highly desirable to obtain an improvement in such fiber properties as water absorptivity, washability, dyeability and electrical conductivity or antielectrostatic behavior. Moreover, it would be especially helpful if these particular properties could be improved in a controlled manner so as to provide a tailor-made product. Moreover, the improvement in the aforementioned properties should be accomplished without substantially detracting from such properties as tensile strength, elongation, melting point and the like.

It has been established in the prior art that fibers of synthetic polyamides and polyesters differ considerably from natural fibers in such properties as water absorptivity, washability, dyeability and antielectrostatic behavior. For example, the capacity for water retention, determined according to DIN53814 E (German Industrial Standard), is commonly designated in textile technology as the "swelling value," and a comparison of this value for typical synthetic and natural fibers is about as follows: 11% for polycaprolactam, 10.5% for polyhexamethylene adipamide, 3% for polyethylene terephthalate, and on the other hand, from 40 to 50% for cotton and wool. Similarly, the "dry moisture absorption" (measured at 20° C. and 65% relative humidity), is about 4% for polycaprolactam and polyhexamethylene adipamide and about 0.4% for polyethylene terephthalate, whereas this value is about 8% for cotton and about 12% for wool. It is also well known that natural fibers generally have much better affinity for dyestuffs than do the synthetic fibers, and the antielectrostatic behavior and washability of natural fibers is usually better than the synthetic fibers. Therefore, the potential for improvement in polyamide and polyester fibers is well established, but a solution to the various problems involved has been most difficult.

One method of influencing such properties of synthetic fibers has been to impregnate or apply foreign substances to the fiber surface. However, such foreign substances tend to wear off or become washed away from the fiber so that an initial modification of the fiber property is not durable and is gradually lost when using the product. The employment of textile auxiliaries or finishing preparations thus provides only a temporary solution to the problem, particularly with respect to polyamides and polyesters.

A large number of attempts have therefore been made to more strongly develop certain desired properties in synthetic polymers by making structural alterations in the polymer molecule itself. For example, with polyamides and polyesters, the usual diamine and dicarboxylic acid monomers have been substituted with various aliphatic and aromatic side chains. The art further contains descriptions of polymers or polycondensates in which the individual monomers contain a carbon chain interrupted by a hetero-atom. Still another process suggests the use of endo-caprolactam compounds as monomers for conversion into an improved polyamide. This alteration in the molecular structure of the known monomers is often unsatisfactory because an improvement in one particular property of the resulting synthetic fiber causes a deterioration of other desirable properties. For example, an improvement in either water absorptivity or dyeability may also cause a tensile strength or melting point which is much lower than the standards required for a textile product. Thus, previous attempts to modify the molecular structure of polyamides and polyesters have not led to any appreciable commercial success, because the improvement in certain fiber properties is either so slight as to be negligible or else is achieved at the expense of other highly desirable properties such as a high melting point. In some cases, the modification of the ploymer operates selectively on only a single property, and it is quite difficult to obtain an overall improvement for textile purposes. Because of the generally slight effect of polymer substituents or additives, the prior art has never considered the possibility of providing a controlled or predetermined modification of fiber properties.

One object of the present invention is to provide a durable and substantially permanent improvement in the water-absorptivity, dyeability, washability and antielectrostatic behavior (i.e. electric conductivity) of the fiber-forming polyamides and polyesters.

Another object of the invention is to provide improved polyamide and polyester products by introducing a highly effective foreign building block into the linear polymer chain of the polycondensate.

A particular object of the invention is to provide new and useful copolymers of polyamides and polyesters whereby it is possible to controllably influence in a predetermined manner the above-mentioned polymer properties such as water-absorptivity and the like.

Still another object of the invention is to provide modified polyamides and polyesters characterized by an overall improvement in properties for textile applications, such that the resulting synthetic product more closely simulates such natural products as cotton and wool.

Yet another particular object of the invention is to provide modified polyamides and polyesters capable of acting as ion exchange substances, for example when employed as a porous fabric or as a permeable film or membrane.

These and other objects and advantages of the invention will be more readily appreciated upon consideration of the following detailed specification.

It has now been found, in accordance with the invention, that synthetic fiber-forming linear polyamides and polyesters with highly improved and novel properties can be obtained if they are modified so as to include by condensation into the linear polymer chain a relatively small amount of certain phenoxy compounds or derivatives which contain special side chain substituents. The substituted phenoxy compounds of the invention are highly active and can be employed to influence a number of different polymer properties, and depending upon the concentration in which the phenoxy compounds are used and their specific structure, polyamides and polyesters can be modified within relatively broad limits. The compounds of the invention which are added as a modifying unit in the polymer chain are designated by the following formula:

(A) 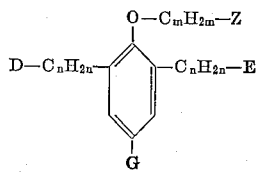

wherein:

Z is a member selected from the group consisting of hydrogen, —$SO_3H$ and its alkali metal and ammonium salt, —$NR_1R_2$, —$N^{\oplus}R_1R_2R_3X^{\ominus}$, —$NR_1$—$C_yH_{2y}$—$SO_3H$ and —$N^{\oplus}R_1R_2$—$C_yH_{2y}$—$SO_3^{\ominus}$, D and E each represent a member selected from the group consisting of —NHR′, NHAcyl, —$N^{\oplus}R'H_2X^{\ominus}$, —$N^{\oplus}R'H_2SO_3^{\ominus}$,

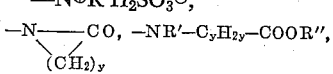
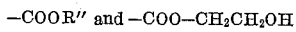

—COOR″ and —COO—$CH_2CH_2OH$

G represents a member selected from the group consisting of alkyl, aryl and —O—$C_mH_{2m}$—Z $R_1$, $R_2$ and $R_3$ each represent a substituent selected from the group consisting of hydrogen, alkyl and aryl;

X represents halogen;

m is an integer of from 1 to 24, inclusive;

n is an integer of from 0 to 12, inclusive; and y is an integer of from 1 to 8, inclusive.

The function of each of the substituents or reactive groups in the phenoxy compound (A) can be described briefly as follows. The Z group, connected to the benzene nucleus through the oxyalkylene chain, acts to impart hydrophilic properties to the compounds (A) and to the polyamides or polyesters in which such compounds are incorporated. The divalent alkylene linkage —$C_mH_{2m}$ contain from 1 to 24 carbon atoms, with a higher number of carbon atoms such as 6 to 24 being preferred where Z is hydrogen and otherwise a preferred number of about 1 to 10 carbon atoms.

The reactive groups D and E act as a means of condensing these compounds into the linear polymer chain of the polyamide and polyester macromolecules, and D and E may be identical or different groups. D and E may be connected directly to the benzene nucleus but are preferably attached through the alkylene bridge —$C_nH_{2n}$— where n is equal to 1 to 12.

The substituent G serves primarily the purpose of blocking the reactive para-position of the basic phenolic compound employed in the synthesis of the compounds (A) and is therefore preferably an inert or neutral alkyl or aryl hydrocarbon substituent, preferably lower alkyl such as methyl, ethyl, propyl or butyl or a simple aryl group such as phenyl. However, G can also be selected to provide additional or stronger hydrophilic properties by using a longer chain alkyl radical of up to 24 carbon atoms or by using alkyl of 1 to 24 carbon atoms substituted by another —O—$C_mH_{2m}$—Z group. Accordingly, G may be represented as —R—O—$C_mH_{2m}$—Z where R is again an alkylene radical of 1 to 24 carbon atoms, preferably 1 to 10 carbon atoms, or an aryl radical such as phenyl, and Z has the same meaning as designated above.

The nitrogen substituents in the Z group as designated by $R_1$, $R_2$ and $R_3$ should be carefully selected in forming a purely linear polycondensate, free of cross-linking, such that the nitrogen atom is present in the form of a tertiary or quaternized amine, i.e. where $R_1$ and $R_2$ represent only alkyl or aryl while $R_3$ represents alkyl, aryl or hydrogen. Thus, $R_3$ would be hydrogen in the HCl-salt of a tertiary amino group. Since the present invention contemplates a use of the polycondensates in the form of films as well as fibers, $R_1$ and $R_2$ may also be hydrogen where a certain degree of cross-linking can be tolerated. Thus, in a film employed for its ion exchange properties, the fiber-forming properties of a truly linear polymer are of secondary importance.

The substituents R′ and R″ in the groups D and E may be either hydrogen or an equivalent substituent such as alkyl or aryl since groups D and E will always bear at least one reactive hydrogen atom in a primary or secondary amino group or their quaternized derivatives. Where R″ is employed in esterifying a carboxylic group, it is preferably methyl so as to be readily split off and removed as methanol from any polymerization medium. Otherwise, R′ and R″ as well as $R_1$, $R_2$ and $R_3$ are preferably lower alkyl such as methyl, ethyl, propyl or butyl or an aryl group such as phenyl. Where the groups D and E contain the substituent -NHAcyl, the acyl portion is preferably benzoyl or the residue of a lower fatty acid, e.g. acetyl, propionyl or butyryl in order to permit condensation polymerization to be easily carried out by saponification or transamidation of these substituents The halogen substituent X in any of the Z, D or E groups is preferably chlorine or bromine.

The present invention is not concerned with new polymers as characterized by the exclusive use of new monomers. Instead, the invention is directed to the modification of known polyamides and polyesters by the use of small amounts of a modifying monomeric compound (A) to form mixed polymers or copolymers, and in a narrower sense, graft and block polymers or interpolymers. The modifying unit can be added to the known polyamide or polyester substances either before or during polymerization of the monomers or to the known polymer after there has been substantially complete polycondensation but before further processing into filaments, films or the like. The techniques of polycondensation, formation of block or graft polymers and similar polymerization reactions are well known in this art, and conventional polymerization methods are employed in the present invention for incorporating the phenoxy compounds (A) in the polymer chain.

The polyamides and polyesters to be modified according to the invention are preferably those which normally have excellent "primary" fiber properties, i.e. such mechanical or physical properties as tensile strength, elongation and relatively high melting points, and there is now a well-defined class of such fiber-forming polymers. For example, the fiber-forming polyamides are generally either polylactams, including polycaprolactam, polycaprylic lactam and polyoenanthic lactam, or else they are polycondensation products of a dicarboxylic acid and a diamine, polyhexamethylene adipamide being the most common example of a "nylon" polyamide.

Suitable aliphatic dicarboxylic acids for preparing polyamides are those which contain about 2 to 12 carbon atoms, preferably those containing 6 to 10 carbon atoms, i.e. adipic acid, pimelic acid, suberic acid, azelaic acid and sebacic acid. Suitable aliphatic diamines to be used in conjunction with dicarboxylic acids in forming polyamides are those containing about 4 to 12 carbon atoms and preferably 6 to 10 carbon atoms, e.g. tetramethylene diamine, pentamethylene diamine, hexamethylene diamine, octamethylene diamine and dodecamethylene diamine. Of course, a single acid is usually paired with a single amine, and polymerization is most commonly carried out wit han acid-amine salt as the monomer, but mixtures of these components are also useful.

The known fiber-forming polyesters are prepared by polycondensing a dicarboxylic acid, or more commonly its dimethyl ester, with a suitable glycol. Terephthalic acid or its dimethyl ester are most widely employed as the acid component while ethylene glycol is the most common glycol component. Isophthalic acid has been employed to a much smaller extent, usually in combination with hexamethylene glycol. Other dicarboxylic acids, which are usually employed as modifiers in an amount of up to 10 molar percent, include sebacic, adipic, bibenzoic, naphthalic and hexahydroterephthalic acid. The glycol component generally contains from about 2 to 6 carbon atoms, including tetramethylene glycol, hexamethylene glycol and diethylene glycol in addition to ethylene glycol.

As noted above, the modifying unit of the invention as derived from the phenoxy compounds (A) can be condensed into the known polyamides and polyesters as initial monomers by addition before or during the polymerization reaction or by addition after obtaining the known polycondensate so as to form a graft or block polymer. The term "condensed" is employed herein in its broadest sense to include all of the known procedures of forming linear polyamides and polyesters, even though the reaction proceeds by ester interchange, transamidification or that condensation in which a molecule of water or other small molecule such as methanol is split off and removed each time a linkage is formed. Thus, the polymerization of caprolactam can be considered as a condensation reaction in this broad sense, even when carried out under anhydrous conditions.

Depending upon the desired result during polycondensation, the modifying units of the invention can be incorporated in the polymer chain in an amount which is relatively small, e.g. about 0.1 molar percent up to a relatively large amount of about 10 molar percent. In most instances, it is preferred to employ the modifying agent of the invention in an amount of about 0.15 or 0.2 up to about 2 molar percent. The term "molar percent" is employed herein with reference to the total number of individual and distinct monomeric units in the condensed chain, i.e. according to the formula $100M_A/(M_A+M_D)$ where $M_A$ is the number of mols of a phenoxy compound (A) and $M_p$ is the total number of mols of those monomeric compounds required for the known polymer. In the case of caprolactam, $M_p$ would equal the total number of mols in this monomer; whereas with hexamethylene adipamide, $M_p$ would equal the total number of mols of both hexamethylene diamine and adipic acid since one mol of each is required to produce the "monomeric salt." Likewise, with polyethylene terephthalate, $M_p$ would equal the number of mols of terephthalic acid plus the number of mols of ethylene glycol.

The modifying compounds (A) of the present invention can be employed individually or as mixtures, including precondensate salts or esters with the known monomers or with each other. Some of the compounds (A) will form inner ammonium salts as indicated by such Z groups as—$N^\oplus R_1R_2R_3X^\ominus$ or such D or E groups as —$N^\oplus R'H_2X^\ominus$, and these may also be used as monomeric reactants. Other salt type compounds include the metal salts of the —$SO_3H$ substituent in any of the phenoxy side chains, preferably the alkali metal salts of potassium and sodium.

Depending upon the praticular hydrophilic group Z or the reactive group D and E, a number of different effects can be observed, in the polymerization or polycondensation reaction itself as well as in the properties of the final polymer. Most importantly, of course, is the effect of the Z group on the water absorptivity, dyeability, washability and antielectrostatic properties of the end product. These properties are improved and their relative values are increased with increasing concentration of the built-in modifying additives (A), and in addition the hydrophilic properties of the polymer will increase as the substituent Z itself increases in hydrophilic character. For example, the hydrophilic effect increases as one proceeds from the substituent —H through —$NR_1R_2$ and —$SO_3Na$ to $$—N(CH_3)—CH_2—CH_2—SO_3H$$

The substituent Z can also be selected such that polymers prepared with the modifying compounds (A) and processed into filaments, fabrics or films will have more or less the character of an ion exchange material, especially where there are ammonium or sulfite ions attached along the polymer chain.

The reactive groups D and E can influence the formation of the polyamide and polyester copolymers or mixed condensates in a number of different ways depending upon the particular substituents which are selected and the manner in which they are condensed into the polymer. For example, if the substituents D and E are identical to each other, then the compounds (A) are in most cases either diamines or dicarboxylic acids; if D and E are different, then an aminocarboxylic acid is present. In the latter instance, the compounds (A) can be added in larger amounts to polyamides or also to polyesters without causing any limitation of the chain growth, i.e. without having a stabilizing effect.

If the compounds (A) are either diamines or dicarboxylic acids, then they will act simultaneously as stabilizers in the production of polyamides and polyesters from the usual and known monomers having an equivalent number of the two reactive groups required for condensation. This stabilizing property can be extremely desirable since it leads to melting-resistant polymers. In the case of lactam polymers and, for example, when D and E signify the group —$N^\oplus H_2R'X^\ominus$ in the additive (A), the reformation of monomers is strongly retarded so as to provide stability against melting. The stabilizing effect can be very advantageously utilized where the additive (A) is used only in small amounts, for example, under 0.5 molar percent.

If the compounds (A) as diamines or dicarboxylic acids, are used in larger amounts, preferably 0.15 to 2 molar percent, then the chain-breaking or stabilizing effect can be partly or completely nullified by a selective addition of a dicarboxylic acid to the diamine compound or a diamine to the dicarboxylic acid compound. In order to substantially avoid stabilization while introducing relatively large amounts of the compound (A), thereby providing maximum hydrophilic properties, it is preferable to employ the compounds (A) in the form of neutral salts. For this purpose it is possible, for example in the case of polyamides, to add a diamine (A) as neutral salt of adipic acid. Correspondingly, it is also possible to add a dicarboxylic acid (A) as neutral salt of hexamethylene diamine. Finally, a neutral salt obtained by combining a diamine (A) and a dicarboxylic acid (A) can be employed as the additive. In the polymerization of lactams, such an addition of a neutral salt to an anhydrous or water-free lactam yields the additional advantage of a very considerable catalytic acceleration of the polymerization reaction. In the usual technological method of producing polyethylene terephthalate, wherein glycol is employed in excess, the compounds (A) can be added without difficulty either as free dicarboxylic acids or as dimethyl or diglycol esters.

Since basic or acid end groups can be generated in excess or in equivalent amounts in the polycondensates, or in conjunction with neutral end groups, the dyeability of polymer fibers can be varied within wide limits. In general, the copolymers or mixed condensates of the present invention can thus be given a controlled affinity for a wide variety of known dyestuffs.

As the neutralizing component in order to avoid stabilization by the compounds (A) or to provide neutral end groups, any suitable acid, amine or alcohol can be used, depending upon the group to be neutralized and the desired characteristics in the final product. (Conventional stabilizers can also be employed in the various condensation reaction.) For example, the neutralizing acid can be a dicarboxylic acid or its ester or among others, also phosphoric acid. As the neutralizing amine or alcohol, any suitable diamine or diol can be employed. Those neutralizing compounds are preferably selected which take part in the polymerization either as fundamental monomers, or else those which are characterized by their hydrophilic properties. According to the invention, all of the compounds (A) can serve as neutralizers with hydrophilic properties, but more common monomers may also be employed such as: adipic acid or adipic acid ester and terephthalic acid or terephthalic acid ester as acid types; hexamethylene diamine and xylylene diamine as amine types; and ethylene glycol and higher alkylene diols as alcohol types.

The installation of the compounds (A) into polyamide or polyester chains can be accomplished under conventional reaction conditions for condensation, transamidation or ester interchange. These reactions are also possible for installation of the compounds (A) into the known polymers before spinning into filaments, thereby providing a graft or block polymer. Depending on the type of fundamental known monomers and of the installable groups D and E in the modifying compounds (A), various types of polymers can be produced which differ from one another through the number of the modifying units per macromolecule, through the nature of the end groups and through the molecular distribution. Furthermore, the polymerization and the resulting polymer can be influenced by the matter of whether the reaction is carried out in the absence of or in the presence of water and/or an additional stabilizer such as a monofunctional-carboxylic acid, -amine or -alcohol.

If, for example, a modifying diamine or dicarboxylic acid of the formula (A) is added to a caprolactam polymerization in the presence of water, then each polymeric chain contains at most one modifying unit, the end groups are predominantly or exclusively either amino groups or carboxyl groups and the molecular distribution curve is much narrower than without the additive in question. The amount of the additive is determined in this case by the particular chain length which is desired. If a modifying diamine of the formula (A) is used in the form of an ammonium salt, for example as the di-HCl salt, then it is possible to carry out the caprolactam polymerization in a water-free medium, and the resulting polymers have a narrower molecular distribution and an especially high melting stability. When the polymers produced in the this manner contain only one molecule of the additive per macromolecule, the swelling value diminishes with increasing molecule size, i.e. with longer polymer chains.

As diamines of the formula (A) suitable for the purpose of the present invention, the following compounds can be listed in detail:

(I/0)

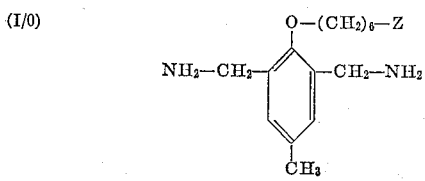

(I/1)

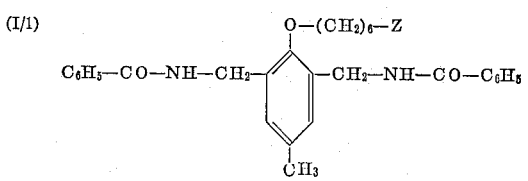

(I/2)

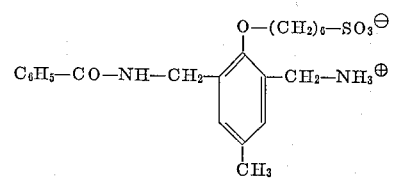

(I/3)

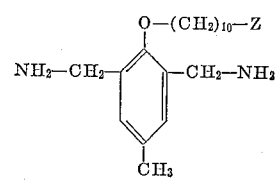

(I/4)

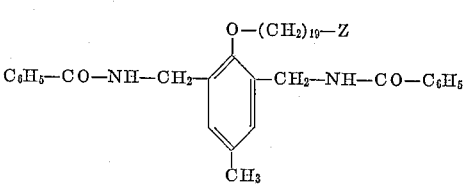

(I/5)

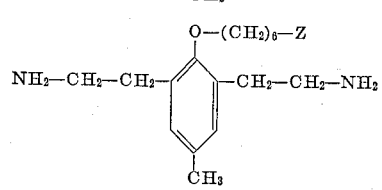

As suitable dicarboxylic acids or dicarboxylic acid esters of the formula (A), the following can be listed:

(II/0)

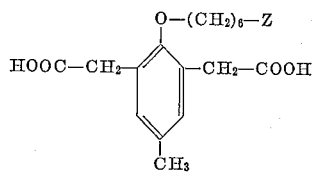

(II/1)

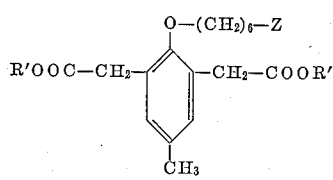

(II/2)

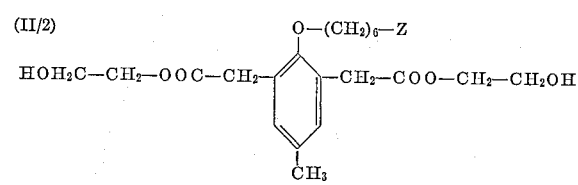

(II/3)

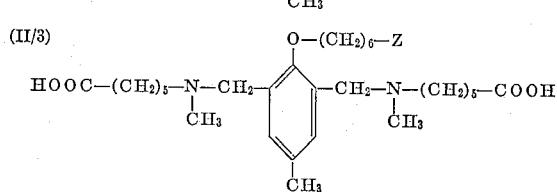

As a suitable amino-carboxylic acid of the formula (A), an illustrative example would be as follows:

(III/0)

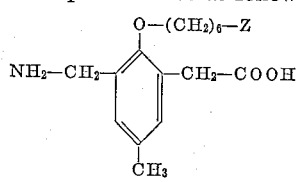

For the production of the diamino compounds (A) p-cresol is used as initial reactant and its Na-salt is brought into reaction with an alkyl- or alkylene-dihalide, preferably the bromides:

(1) 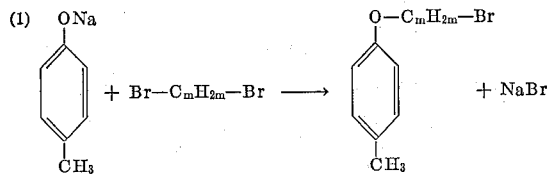

For the installation of the substituents D and E in 2,6-position of the benzene nucleus it is possible to convert the bromine ether of reaction (1) in cold sulfuric acid with an N-methylol compound, as for example N-methylol benzamide, N-methylol phthalimide, N-methylol-ε-caprolactam, almost quantitatively to the corresponding substituted 2,6-bis-aminomethylcresol ethers, as for example:

(2) 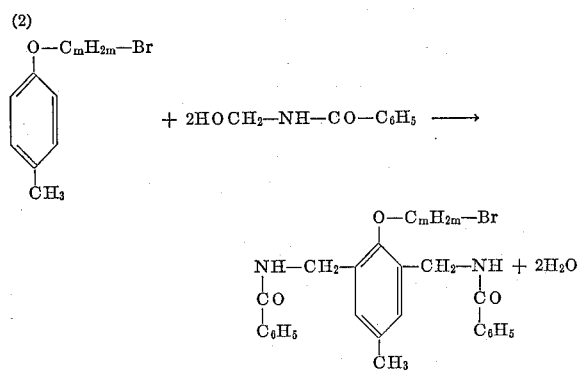

By conventional or readily understood reaction procedures, it is possible, finally, to replace the Br of the aliphatic ether chain by one of the above-mentioned Z substituents. Thus, for example the compound (I/1) with $Z=-SO_3Na$ is obtained by sulfonating the product of reaction (2) with sodium sulfite in aqueous alcohol solution. The compound (I/1) with

can be obtained if the nucleus-substituted bromine ether of reaction (2) is converted with methyltaurin-Na in dimethylformamide, after which it is possible to convert Z by methylation smoothly into

The saponification of the benzoyl compounds is accomplished with concentrated strong alkali, that of the phthalimido compounds by the hydrazine method.

For the preparation of the dicarboxylic acids (A), it is possible to proceed, for example, from 2,6-bis-methylol-p-cresol, whose Na-salt is brought into reaction with an alkylene dihalide, preferably the bromides:

(3) 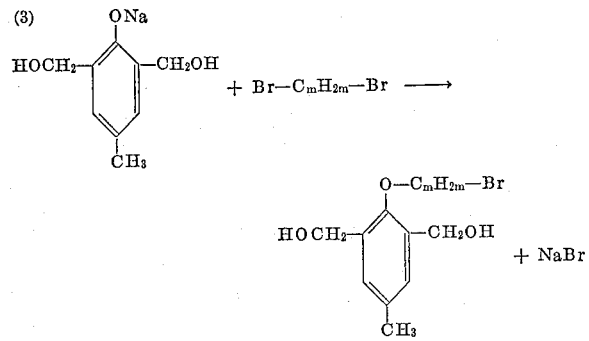

At temperatures of 50 to 80° C. it is possible by suitable reactions to replace the Br of the aliphatic ether chain by one of the above-mentioned Z residues, in several reaction steps if necessary. Thus, for example, by sulfonating with sodium sulfite in aqueous alcohol solution there is obtained the sodium salt of the corresponding sulfonic acid. The methylol groups of the sulfonic acids obtained are then converted by means of hydrogen halide acids into chloromethyl- or bromomethyl groups and these, over the dinitriles are converted under alkaline saponification into the corresponding dicarboxylic acids.

By hydrogenating the intermediate dinitriles, expediently with lithium-aluminum hydride, it is possible to readily obtain the corresponding 2,6-bis-aminoethyl compounds.

For the production of dicarboxylic acids (II/3), the 2,6-bis-methyl halide compounds are converted with ω-methyl-aminocapronitrile in ether, and the dinitrile is saponified with strong alkali.

The amino-acids (A), such as the compound (III/0), are also readily accessible since the above-mentioned 2,6-bis-monomethyl compounds can be converted on one side with potassium phthalimide. After replacement of the remaining Br by —CN and preferably after completion of the substitution on the aliphatic ether chain, the amino acids are obtained by an expediently gradual saponification.

The properties of some of the compounds to be used according to the invention are described immediately below. The chemical designation in each case is preceded by an abbreviated designation or code number in order to simplify a later reference to these compounds in the working examples. The residue $p$-$CH_3$—$C_6H_4$—O— is designated as the p-cresoxy group.

(I) *Diamines*

(I/00): Diamine of structure (I/0) with $Z=H$; 1-[2,6-bis-aminomethyl-p-cresoxy]-n-hexane. Colorless, viscous oil with strongly basic properties, boiling point of 160° to 170° C. at 0.05 mm. Hg. Neutral salt with adipic acid: white powder soluble in water and methanol, melting point of 183° to 185° C.

(I/10): Bis-benzoyl diamine of structure (I/1) with $Z=H$; 1-[2,6-bis-benzoylaminomethyl - p - cresoxy]-n-hexane. Colorless needles from ethanol-water, melting point of 152° to 153° C.

(I/01): Diamine of structure (I/0) with $Z=SO_3Na$; 1-[2,6-bis-aminomethyl - p - cresoxy]-n-hexane-sulfonic acid-(6) sodium. The HCl salt of the sodium-free compound forms colorless needles from water, melting point of 254° to 256° C. It binds table salt in stoichiometric amounts during crystallization from NaCl solutions. The salt, consisting of 1 mol diamine (I/01) and 1 mol adipic acid, forms a white, water-soluble powder, melting point of 220° to 225° C.

(I/11): Bis-benzoyldiamine of structure (I/1) with $Z=SO_3Na$; 1-[2,6-bis-benzoylaminomethyl - p - cresoxy]-n-hexane-sulfonic acid-(6) sodium. Colorless needles from 5% table salt solution, melting point of 215° to 218° C.

(I/02): Diamine of structure (I/0) with

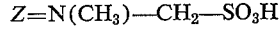

[2,6-bis-aminomethyl - p - cresoxy]-hexamethylene-N,N-methyl-taurine. Strongly alkaline oil. The di-HCl salt forms a colorless, hygroscopic powder without a defined melting point.

(I/12): Bis-benzoyldiamine of structure (I/1) with $Z=N(CH_3)$—$CH_2$—$CH_2$—$SO_3H$; [2,6 - bis - benzoyl-aminomethyl - p - cresoxy]-hexamethylene-N,N-methyl-taurine. Colorless needles from alcohol-water, melting point of 147° to 148° C.

(I/13): Bis-benzoyldiamine of structure (I/1) with $Z=N^{\oplus}(CH_3)_2$—$CH_2$—$CH_2$—$SO_3^{\ominus}$; [2,6 - bis - benzoyl-aminomethyl - p - cresoxy] - hexamethylene - dimethyl-taurobetaine. Colorless needles from alcohol-water, melting point of 170° to 173° C.

(I/41): Bis-benzoyldiamine of structure (I/4) with $Z=SO_3Na$; 1-[2,6-bis-benzoylaminomethyl - p - cresoxy]-n-decansulfonic acid-(10)-sodium. Colorless needles from alcohol-water, melting point of 192° to 193° C.

(I/50): Diamine of structure (I/5) with Z=H; 1-[2,6-bis-aminoethyl - p - cresoxy]-n-hexane. Colorless, viscous oil with strongly basic properties, distillable without decomposition, boiling point of 170° to 175° C. at 0.03 mm. Hg. Neutral salt with adipic acid: colorless from alcohol-ether, melting point of about 150° C.

(II) *Dicarboxylic acids*

(II/00): Dicarboxylic acid of structure (II/0) with Z=H; 1-[2,6-bis-carboxymethyl - p - cresoxy]-n-hexane. Not readily soluble in water; long, colorless needles from water, melting point of 139° to 140° C. Neutral salt with hexamethylene diamine: water-soluble powder, melting point of 194° to 195° C.

(II/01): Dicarboxylic acid of structure (II/0) with Z=$SO_3Na$; 1-[2,6 - bis - carboxymethyl - p - cresoxy]-n-hexane-sulfonic acid-(6) sodium. Colorless needles from water, melting point of 225° to 226° C. Neutral salt with hexamethylene diamine; colorless needles from water, melting range 215° to 220° C.

(II/11): Dimethyl ester of dicarboxylic acid (II/01). Colorless needles from methanol, melting point of 230° to 233° C.

*Salts from diamines (I) and dicarboxylic acids (II)*

It is, in particular, an object of the present invention to use salts from the diamines (I) as additives for polycondensates. In some cases, these salts do not need to be isolated, but can be produced in aqueous solution and added directly to the condensation reaction. If necessary, the inorganic neutral salts formed, e.g. in the production of the solutions, can be removed by means of ion exchangers. Several of the salts formed from diamines (I) and dicarboxylic acids (II) are listed below with their properties:

Salt from (I/00) and (II/00): White powder, difficult to dissolve in water; melting point of 105° to 110° C.

Salt from (I/00) and (II/01): White, water-soluble, dry powder; melting point of 60° to 65° C.

Salt produced from 1 mol HCl salt of (I/01), 1 mol (II/01) and 2 mols NaOH: White, water-soluble, dry powder; melting point of 175° to 180° C.

Salt produced from 2 mols HCl salt of (I/01), 1 mol (II/01) and 2 mols NaOH: Colorless, water-soluble needles; the melting point is dependent on the kind of heating and is about 140° C. as the immersion melting point and about 190° to 200° C. with a slow rise in temperature.

(III) *Amino acids*

(III/00); Amino acid of structure (III/0) with Z=H; 1 - [2 - aminomethyl - 6 - carboxymethyl - p - cresoxy] - n-hexane. White, fine crystalline powder, not readily soluble in water, melting point of 170° to 175° C.; forms a nitrate, not readily soluble as colorless needles with melting point of 161° to 162° C.

The present invention is more fully illustrated by the following examples and tables. The accompanying drawing also provides a graphical representation of comparative results. These examples are directed to particular species of the modifying compounds (A), and it will be understood that such examples are not intended to be the exclusive practice of the invention. Example 10 is a standard polyamide and Example 13 is a standard polyester, i.e. the modifying compound (A) was omitted in these examples so as to provide a basis for comparison. In the remaining examples, the modifying compound (A) is identified by its code number as employed in the immediately preceding paragraphs.

As will be recognized from the following examples and comparisons, the present invention provides substantial and controllable improvements in such secondary fiber properties of polyamides and polyesters as their water-absorptivity, washability, dyeability and electric conductivity. These improvements are furthermore realized at relatively low cost since only a small proportion of the modifying compounds is required and these modifiers can be condensed or linked into the polymer chain with conventional process steps.

*Example 1*

22.6 grams of water-free ε-caprolactam are heated under a nitrogen vacuum of 3 to 4 mm. Hg in a sealed glass tube with 1.0 molar percent of the neutral salt of the diamine (I/00) and the dicarboxylic acid (II/00), with occasional shaking, for 24 hours at 220° C. After cooling, the polyamide is ground, extracted with methanol for 18 hours and dried.

*Example 2*

The polyamide is prepared as in Example 1, but with the use of 5.0 molar percent of the neutral salt of the diamine (I/00) and dicarboxylic acid (II/00).

*Example 3*

The polyamide is prepared as in Example 1, but with the use of the neutral salt of the diamine (I/00) and the dicarboxylic acid (II/01).

*Example 4*

The polyamide is prepared as in Example 1, but with the use of the neutral salt of the diamine (I/01) and adipic acid.

*Example 5*

The polyamide is prepared as in Example 1, but with the use of the neutral salt of the diamine (I/01) and the dicarboxylic acid (II/01).

*Example 6*

The polyamide is prepared as in Example 1, but with the use of the neutral salt of hexamethylene diamine and the dicarboxylic acid (II/01).

*Example 7*

The polyamide is prepared as in Example 1, but with the use of the neutral salt of the diamine (I/02) and adipic acid.

*Example 8*

The polyamide is prepared as in Example 1, but with the use of the neutral salt of the diamine (I/02) and and the dicarboxylic acid (II/01).

*Example 9*

The polyamide is prepared as in Example 1, but with the use of the amino acid (III/00).

*Example 10*

This is a comparative example of a polyamide prepared without incorporating a modifying additive of the invention. 4.5 kilograms ε-caprolactam are kept with 0.5 kilograms of water in the presence of 0.15 molar percent benzoic acid as a polymerization stabilizer under exclusion of air and under their own pressure of about 10 atmospheres (gauge) in a 10-liter autoclave for 1.5 hours at 220° C. During an additional 1.5 hours, pressure is released to normal and the polymerization is terminated by 4 to 5 hours of washing with nitrogen at 220° C. The polymer is drawn off as an extruded rod, cut up into short lengths and extracted by repeated boiling for several hours with water.

*Example 11*

4.5 kilograms ε-caprolactam are kept with 0.5 kilogram water in the presence of 0.75 molar percent of the neutral salt of the diamine (I/00) and the dicarboxylic acid (II/01) under exclusion of air and at their own pressure of about 10 atmospheres (gauge) in a 10-liter autoclave for 1.5 hours at 220° C. During an additional 1.5 hours, pressure is released to normal and the polymerization is completed by 4 to 5 hours of washing with nitrogen at 220° C. The polymer is drawn off as an extruded rod, cut up into short lengths and extracted by repeated boiling with water for several hours.

Example 12

The polyamide is prepared as in Example 11, but with the use of the neutral salt of the diamine (I/01) and the dicarboxylic acid (II/01).

Example 13

This is a comparative example of a polyester prepared without incorporating a modifying additive of the invention. 100 grams dimethyl terephthalate are heated with 100 ml. of ethylene glycol in the presence of 0.02% by weight of antimony trioxide and 0.015% by weight of zinc acetate under nitrogen in a vessel equipped with an agitator for about 2 hours at 240° to 250° C., in which process about 55 ml. of methanol are distilled off. After application of a vacuum, which is finally raised to about 0.3 mm. Hg, the excess glycol is distilled off, the temperature raised to 275 to 278° C., and the increasingly viscous condensate is fully condensed in about 1.5 hours. The cooled product was ground into a powder.

Example 14

100 grams dimethyl terephthalate are ester-interchanged with 100 ml. ethylene glycol with removal of methanol as described in the second sentence of Example 13. After addition of 2 molar percent of the dicarboxylic acid (II/01), dissolved in 15 to 20 ml. glycol, the process is continued as described in Example 13.

The properties of the polyamides and polyesters prepared according to the foregoing examples are compared in Tables 1–5 as set forth hereinbelow.

In Table 1 the properties of the polyamides produced in Examples 1 to 9 and of the comparative condensate of Example 10 are contrasted. The lactam conversions are between 92 and 94% in all of the examples. The solution viscosity values $Z\eta$ are measured in 82.5% formic acid in Ostwald viscosimeters and are extrapolated to zero concentration. The values listed in Table 1 for the water-absorption capacity, i.e. "swelling value," were determined in powders of equal grain size (sifted to 0.5 to 0.8 mm.) according to DIN 53814 E. In stretched filaments, the swelling values correspond to the values measured with the polymers in the form of powders, as will be apparent by comparing the data of Tables 1 and 2. Since the dyeability, dry moisture absorption and the electrical conductivity in the condensates will vary in magnitude in conformance with the swelling value, the swelling values listed in Table 1 also provide an accurate measure for such additional properties, not only in powders, but also in stretched filaments. In this connection, Tables 3 and 4 present some additional comparative data obtained with stretched filaments containing various additives or no additive (Example 10).

Table 1 shows, in particular, that the swelling value increases strongly with increasing concentration of the modifying additives and with increasing concentration of the hydrophilic groups Z. The melting point of the condensates remains very nearly unchanged within a relatively broad range of additive concentrations.

Table 2 discloses that the primary textile properties of the filaments (tensile strength and elongation) are not substantially affected by the additives.

Table 3 illustrates the effect of the modifying additives upon the dyeability of the polyamides as textile fibers and the substantial change in affinity for different dyestuffs.

In Table 4, there are presented the moisture absorption at 100% relative humidity and the electric resistance of textile fibers for the polyamides of Examples 10, 11 and 12. With increasing concentration of the additives, the moisture absorption increases while the electric resistance diminishes. As will be recognized, the antielectrostatic behavior of the polymer will improve with increasing electric conductivity. The measurement of electric resistance was carried out in samples which were conditioned at 22° C. and 65% relative humidity and were freed of the preparation.

For textile uses, the absorption capacity of a fabric or material is of special interest because of its relation to the washability of the fibers or fabric. In fabrics made of the material of Examples 10 and 12, by immersion in distilled water which contained 1% Nekal [1], the absorption capacity was determined with respect to the time of immersion. It was found that the absorption capacity of the material containing the modifying additive (Example 12) increases rapidly within a relatively short immersion time to a multiple of the corresponding value for the comparative material (Example 10), as shown in the accompanying drawing in which the height of absorption is plotted against the immersion time. This effect can be still further considerably strengthened by dyeing of the fabric.

Table 5 presents some of the properties of polyethylene terephthalates with and without a modifying additive according to the invention by way of comparison. The solution viscosities $\eta_{rel}$ (relative viscosities) are measured in Ostwald viscosimeters for 1% solutions in m-cresol at 25° C. The swelling values were determined with powders in the same manner as in the above-mentioned polyamides.

---

[1] Nekal is a trademark under which "Badische Anilin und Soda-Fabrik," Ludwigshafen, Germany, sells a wetting agent consisting of isopropyl naphthalenesulfonic acid sodium salt.

TABLE 1

[Properties of the ε-caprolactam condensates of Examples 1 to 9 as compared to a standard condensate (Example 10), measured in powders of equal grain size.]

| Example | Additive | Type of substituent Z | Additive concentration, mol percent | $Z\eta \cdot 10^2$ | Swelling value, percent | Melting point in °C. |
|---|---|---|---|---|---|---|
| 10 | None | Comparative condensate | | 7.4 | 13 | 216–218 |
| 1 | I/00 / II/00 | H / H | 1 / 1 | 7.4 | 16 | 212–213 |
| 2 | I/00 / II/00 | H / H | 5 / 5 | 4.7 | 24 | 203–205 |
| 3 | I/00 / II/01 | H / $SO_3Na$ | 1 / 1 | 7.5 | 21 | 212–213 |
| 4 | I/01 / Adip | $SO_3Na$ / | 1 / 1 | 6.7 | 21 | 211–213 |
| 5 | I/01 / II/01 | $SO_3Na$ / $SO_3Na$ | 1 / 1 | 6.0 | 24 | 210–212 |
| 6 | Hexm / II/01 | / $SO_3Na$ | 1 / 1 | 7.6 | 20 | 214–216 |
| 7 | I/02 / Adip | $N(CH_3)-(CH_2)_2-SO_3H$ / | 1 / 1 | 6.8 | 22 | 211–213 |
| 8 | I/02 / II/01 | $N(CH_3)-(CH_2)_2-SO_3H$ / $SO_3Na$ | 1 / 1 | 6.7 | 26 | 212–213 |
| 9 | III/00 | H | 1 | 10.0 | 17 | 212–214 |

TABLE 2

[Mechanical properties of ε-caprolactam condensates from Examples 11 and 12 as compared to a standard condensate (Example 10) measured on stretched filaments, denier 60/12. Concentration of the additives in each case is 0.75 mol. percent. Solution viscosity is measured with the extracted cuttings. The tensile strength is measured in Reiss-Kilometers (Rkm.).]

| Example | Additive | Am't in mol percent | $Z_\eta \cdot 10^2$ | Swelling value, percent | Melting point, °C. | Stretch ratio | Tensile strength (Rkm.) | Elongation, percent |
|---|---|---|---|---|---|---|---|---|
| 10 | None | | 7.4 | 12 | 216–218 | 1:3.0 | 50 | 40 |
| 11 | I/00 II/01 | 0.75 0.75 | 7.0 | 14 | 214–216 | 1:3.0 | 40 | 37 |
| 12 | I/01 II/01 | 0.75 0.75 | 6.6 | 17 | 215–217 | 1:3.2 | 40 | 33 |

TABLE 3

[Dyeability of the ε-caprolactam condensates of Examples 11 and 12 as compared to a standard condensate (Example 10), judged in a fabric of filaments with denier 60/12.]

| Example | Additive | Acid wool dyestuff Anthralandblue B | Dispersion dyestuff Cibacetblue RF | Basic dyestuff Deorlin Brilliant Blue RL |
|---|---|---|---|---|
| 10 | None | Good | Good | Very slight. |
| 11 | I/00 II/01 | Fair | Strong | Moderate. |
| 12 | I/01 II/01 | Weak | Very strong | Do. |

TABLE 4

[Moisture absorption at 100% relative humidity and electric resistance (22° C., 65% relative humidity) of the ε-caprolactam condensates of Examples 11 and 12 as compared to a standard condensate (Example 10), measured on stretched filaments, denier 60/12.]

| Example | Additive | Moisture absorption, Percent by weight | Electric resistance in $10^9$ ohms |
|---|---|---|---|
| 10 | None | 8 | 1,000 |
| 11 | I/00 II/01 | 10 | 350 |
| 12 | I/01 II/01 | 12 | 140 |

TABLE 5

[Properties of polyethylene terephthalates with and without addition of the dicarboxylic acid (II/01), measured in powders of grain size 0.5 to 0.8 mm.]

| Example | Additive | Amount in mol percent | $\eta_{rel}$ | Swelling value, percent | Softening point, °C. |
|---|---|---|---|---|---|
| 13 | None | | 1.63 | 5.4 | 259–260 |
| 14 | II/01 | 2.0 | 1.53 | 7.3 | 257–258 |

The invention is hereby claimed as follows:

1. A synthetic fiber-forming linear polymer selected from the group consisting of polyamides and polyesters containing as a modifying unit condensed into the linear polymer chain from 0.1 to 10 molar percent of at least one compound of the formula

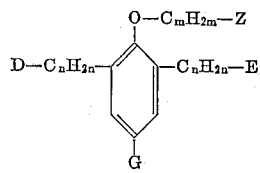

wherein:

Z is a member selected from the group consisting of hydrogen, —SO₃H and its alkali metal and ammonium salts, —NR₁R₂, N⊕R₁R₂R₃X⊖, —NR₁—C_yH_{2y}—SO₃H and —N⊕R₁R₂—C_yH_{2y}—SO₃⊖;

D and E each represent a reactive substituent capable of condensing said modifying compound into said linear polymer chain and selected from the group consisting of —NHR', NHAcyl, —N⊕R'H₂X⊖, —N⊕R'H₂SO₃⊖,

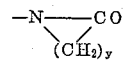

—NR'—C_yH_{2y}—COOR", —COOR" and

—COO—CH₂CH₂OH

G represents a member selected from the group consisting of alkyl of 1 to 24 carbon atoms, phenyl and said alkyl and said phenyl substituted by —O—C_mH_{2m}—Z;

R₁, R₂ and R₃ each represent a substituent selected from the group consisting of hydrogen, lower alkyl and phenyl;

R' and R" each represent a substituent selected from the group consisting of hydrogen, lower alkyl and phenyl;

X represents halogen;

m is an integer of from 1 to 24, inclusive, with the proviso that m is at least 6 where X is hydrogen;

n is an integer of from 0 to 12, inclusive; and y is an integer of from 1 to 8, inclusive.

2. A synthetic fiber-forming polymer as claimed in claim 1 wherein the polymer contains from 0.2 to 2 molar percent of said compound acting as a modifying unit.

3. A synthetic fiber-forming linear polymer as claimed in claim 1 wherein there is condensed into the polymer chain the compound

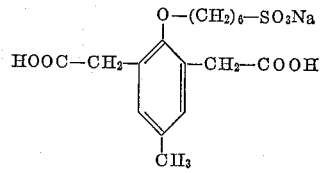

4. A synthetic fiber-forming linear polyamide polymer as claimed in claim 1 wherein there is condensed into the polymer chain the compound

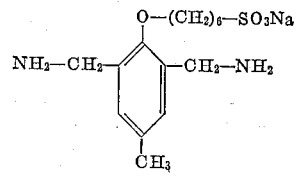

5. A synthetic fiber-forming linear polyamide polymer as claimed in claim 1 wherein there is condensed into the polymer chain the compounds

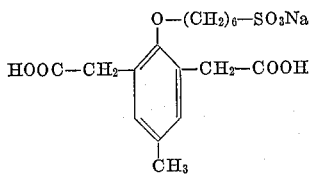

and

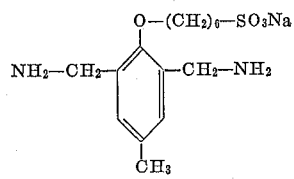

6. A synthetic fiber-forming linear polyamide polymer as claimed in claim 5 wherein said compounds are condensed into the polymer chain in the form of the salt of 1 mol of the dicarboxylic acid to 1 mol of the diamine.

7. A synthetic fiber-forming linear polymer as claimed in claim 1 wherein there is condensed into the polymer chain the compound

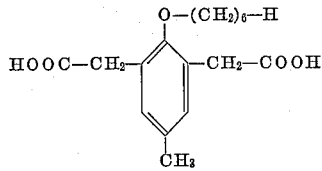

8. A synthetic fiber-forming linear polyamide polymer as claimed in claim 1 wherein there is condensed into the polymer chain the compound

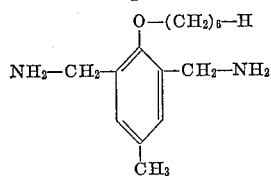

9. A synthetic fiber-forming linear polyamide polymer as claimed in claim 1 wherein there is condensed into the polymer chain the compound

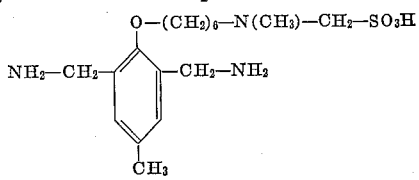

10. A synthetic fiber-forming linear polyamide polymer as claimed in claim 1 wherein there is condensed into the polymer chain the compound

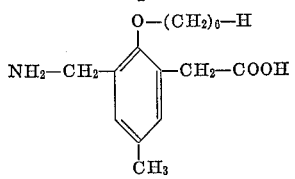

References Cited by the Examiner
UNITED STATES PATENTS

| | | | |
|---|---|---|---|
| 2,894,934 | 7/1959 | Burkhard | 260—75 |
| 2,902,475 | 9/1959 | Burkhard | 260—78 |
| 3,006,899 | 10/1961 | Hill et al. | 260—78 |

WILLIAM H. SHORT, *Primary Examiner.*

LOUISE P. QUAST, *Examiner.*